United States Patent
Janoso et al.

(10) Patent No.: US 9,733,656 B2
(45) Date of Patent: Aug. 15, 2017

(54) SYSTEM AND METHOD FOR AUTOMATED HOUSEHOLD ENERGY MANAGEMENT BASED ON CLASSIFICATION AND LOCATION INFORMATION

(71) Applicant: Salusfin Ltd., Espoo (FI)

(72) Inventors: Radovan Janoso, Espoo (FI); Henrik Jakobsson, Espoo (FI); Tapio Toivanen, Espoo (FI)

(73) Assignee: SALUSFIN LTD., Espoo (FI)

( * ) Notice: Subject to any disclaimer, the term of this patent is extended or adjusted under 35 U.S.C. 154(b) by 549 days.

(21) Appl. No.: 14/254,036

(22) Filed: Apr. 16, 2014

(65) Prior Publication Data

US 2015/0301543 A1    Oct. 22, 2015

(51) Int. Cl.
G05D 3/12 (2006.01)
G05F 1/66 (2006.01)
G05B 15/02 (2006.01)

(52) U.S. Cl.
CPC .............. *G05F 1/66* (2013.01); *G05B 15/02* (2013.01); *G05B 2219/2639* (2013.01); *G05B 2219/2642* (2013.01)

(58) Field of Classification Search
CPC ........................................ G05F 1/66
USPC ................................ 700/275–306
See application file for complete search history.

(56) References Cited

U.S. PATENT DOCUMENTS

| 2001/0010032 A1* | 7/2001 | Ehlers | G05B 15/02 |
| | | | 702/62 |
| 2010/0094476 A1* | 4/2010 | Hamilton, II | G01D 4/004 |
| | | | 700/295 |
| 2010/0324962 A1* | 12/2010 | Nesler | G01R 21/133 |
| | | | 705/7.36 |
| 2011/0047418 A1* | 2/2011 | Drees | G05B 15/02 |
| | | | 714/57 |
| 2011/0125329 A1 | 5/2011 | Oswald | |
| 2012/0022700 A1* | 1/2012 | Drees | G05B 15/02 |
| | | | 700/276 |

(Continued)

OTHER PUBLICATIONS

Du, Pengwei, and Ning Lu. "Appliance commitment for household load scheduling." IEEE transactions on Smart Grid 2.2 (2011): pp. 411-419.*

(Continued)

*Primary Examiner* — Satish Rampuria
(74) *Attorney, Agent, or Firm* — Young & Thompson (57) ABSTRACT

A household energy management system and method, having one or more controlled appliances and an energy profile representing energy consumption, with one or more associated parameters and limits, wherein each of the controlled appliances are assigned a control class, a set of variable values collected, a first group of appliances determined based on the control class, parameters and collected values, a change requested in their power consumption, and the energy consumption of the household measured to calculate a difference between the consumption and energy profile, and a proposed change in the power consumption of appliances of a second group different from the first group is communicated if the difference surpasses one or more of the associated limits, the second group of appliances being determined on basis of the class, parameters and collected values, and a change in power consumption of one or more appliances of the second group requested.

11 Claims, 2 Drawing Sheets

(56) References Cited

U.S. PATENT DOCUMENTS

| | | | |
|---|---|---|---|
| 2012/0065802 A1* | 3/2012 | Seeber | G06F 1/3203 |
| | | | 700/295 |
| 2012/0089269 A1 | 4/2012 | Weaver et al. | |
| 2012/0109397 A1 | 5/2012 | Shim et al. | |
| 2012/0245744 A1* | 9/2012 | Prosser | H02J 3/46 |
| | | | 700/286 |
| 2012/0252430 A1 | 10/2012 | Imes et al. | |
| 2013/0085614 A1* | 4/2013 | Wenzel | F24F 11/006 |
| | | | 700/277 |
| 2013/0085616 A1* | 4/2013 | Wenzel | G05F 1/66 |
| | | | 700/278 |
| 2013/0184892 A1* | 7/2013 | Mohan | G05B 15/02 |
| | | | 700/297 |

OTHER PUBLICATIONS

Ozturk, Yusuf, et al. "An intelligent home energy management system to improve demand response." IEEE Transactions on Smart Grid 4.2 (2013): pp. 694-701.*

Barbato, Antimo, et al. "House energy demand optimization in single and multi-user scenarios." Smart Grid Communications (SmartGridComm), 2011 IEEE International Conference on. IEEE, 2011. pp. 345-350.*

Jukka V. Paatero et al., "A model for generating household electricity load profiles," International Journal of Energy Research, 2006, vol. 30, XP-002754946, pp. 273-290.

European Search Report dated Mar. 10, 2006, for corresponding European Application No. 14196981.

* cited by examiner

SYSTEM AND METHOD FOR AUTOMATED HOUSEHOLD ENERGY MANAGEMENT BASED ON CLASSIFICATION AND LOCATION INFORMATION

TECHNICAL FIELD

Generally, the invention relates to home automation systems and particularly to automated systems for energy usage management in buildings. Further, the invention relates to associated methods of such systems.

BACKGROUND TECHNOLOGY

Household or building energy usage (in terms of kWh etc.) is metered primarily for billing purposes by the power producers, distributors, marketers and brokers. Present technology power grid control and data acquisition systems have made it possible to offer consumers applications to monitor their realized past energy consumption or near real time present energy consumption levels. Energy consumption of individual electric appliances can be monitored individually by dedicated metering devices but the household energy consumption applications are not able to divide the metered consumption to appliances level resolution.

The growing awareness among consumers about environmental issues, energy prices and their own energy consumption may steer the consumer behavior, the consumer striving to save energy resources, save energy cost, make choices between different sources of electricity or a combination thereof.

To meet a desired effect in a chosen energy scheme, the consumers often are limited to the choices of actively monitoring and changing their using habits involving the use of electricity, using more energy-efficient appliances, if available, and monitoring and selecting most cost effective combinations of energy providers. Environmental decision between different sources of electrical energy usually leads to personal cost savings only if the consumption habits can be effectively adapted accordingly.

Energy and cost saving together with environmental aspects, poses thus presently a fragmented information problem, where the different levels of awareness and activity among the consumers greatly affect the total outcome and success of such goals.

SUMMARY OF THE INVENTION

It is an object of the present invention to implement such a solution, that previously mentioned drawbacks of the prior art could be diminished. In particular, the invention is drawn on the findings of the inventors, that a measureable energy and cost management is achievable by actively steering household energy consumption by use of appliance classification, location information and household energy profile according to the present invention, as will be described in this application.

The present invention provides an automated household energy consumption management method and system with various embodiments using appliance classification, location information and household energy profile. In this context a reference to energy consumption, budget and savings refer to, for example, electrical energy, monetary units etc.

An automated household energy management system and method suggested herein offer an approach to automatically manage household energy usage and further to inform and advice the user, based on a created and updated home energy profile, in decisions and acts involving or affecting, directly or indirectly, use of energy. The home energy profile is created and updated based on the monitored household energy consumption and collected parameters and variables.

Further, an automated household energy management system and method suggested herein offer an approach to automatically manage household energy usage by determining alternative control schemes abiding to set parameters and preferences with an different energy consumption and further to inform and advice the user, based on a created and updated home energy profile, in alternative decisions and acts involving or affecting, directly or indirectly, use of energy. Even further, the automated energy management system and method are provided with arrangements and configurable to choose between alternatives to minimize the energy consumption. The automated energy management system and method are also provided with arrangements and configurable to guide a user between suggested or possible alternatives to minimize the energy consumption.

Appliances that are to be controlled by the automated household energy management system and are connected to an associated automated household energy management system network, are preferably assigned a control classification or a corresponding "savings" class.

When the automated household energy management system is initially setup, the household energy profile may be created by collecting parameters describing the type and usage of the controlled household together with past or present energy consumption of the household. The profile is advantageously continuously or periodically updated by measured energy consumption and observed variables such as person presence, outside temperature, weather conditions etc.

According to the system and method of the present invention the consumed energy of the household is measured taking in to account, additionally to the collected parameters and past energy usage, variables such as person presence, outside temperature, weather, time period etc.

Deviation between measured data and the household energy profile is calculated. Limits for the deviation may be used to define an allowable or normal deviation range and a limit after which a deviation may be regarded as a change of the expected energy consumption pattern.

A change of the expected energy consumption pattern triggers automated actions to change the energy consumption of the household. Further, a change of the expected energy consumption pattern triggers providing suggestions to the users of the automated household energy management system which aims to change the energy consumption of the household based on actions of the users.

Even though the present application makes reference to "household" or "house" as the object of intended energy management, it is readily understood by the person skilled in the art, that the system and method according to the present invention finds equal use in the energy usage management of enclosures in general and buildings, facilities, apartments, offices and office buildings, industrial plants, rooms etc. in particular. References to "user" may indicate an occupant or a third party having at least a restricted access to the automated household energy management system.

The objective of the invention is generally met by the features disclosed in the independent patent claims. Some preferable embodiments of the invention are described in the associated dependent claims. More embodiments will be set forth in the detailed description hereinafter.

Significant advantages can be achieved with the present invention when compared to the prior art solutions depending on the particular embodiment in question. According to the present invention, the presently encountered fragmented and user behavior and knowledge dependent energy usage management problem is solved by an automatic household energy usage management and user guidance in decisions and acts involving or affecting, directly or indirectly, use of energy. Even further, the lack of detailed appliance level energy consumption of present energy consumption monitoring applications or the tedious and costly integration of such information are neglected by the adaptation of the appliance classification and household energy profile in accordance with the present invention.

SHORT DESCRIPTION OF THE DRAWINGS

Next, the invention is described in more detail with reference to the appended drawings, in which.

DETAILED DESCRIPTION OF THE EMBODIMENTS

The system and method according to the present invention will now be discussed in further detail by disclosing non-limiting embodiments for illustrative purposes with appropriate references to the appended drawings.

Figure 1:
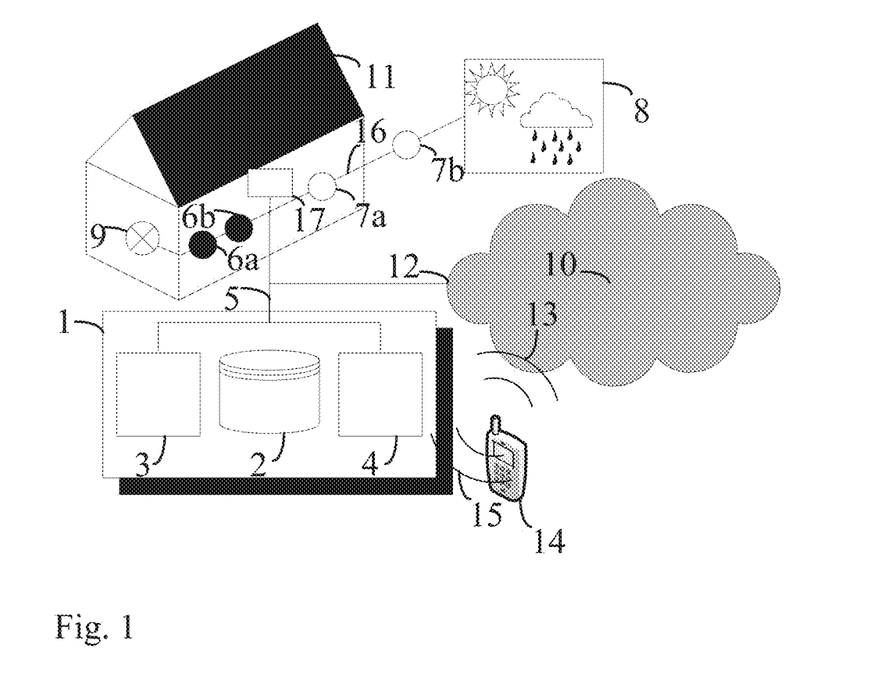
FIG. 1 illustrates one embodiment of an automated household energy management system with exemplary arrangement of system entities and associated devices according to the present invention.

In one other aspect, an automated household energy management system 1 illustrated in FIG. 1 can include memory or storage space 2, one or more processing resources 3 or controllers 4 such as a central processing unit (CPU) or hardware or software control logic. Additional components of the automated household energy management system can include one or more wireless, wired or any combination thereof of communications arrangements 5 and an associated control network 16 including associated protocols or enhancements thereto including, but not limited to, any combination or portion of various proprietary communications, or any combination thereof to communicate with external devices such as electric appliances 6, sensors 7, data providing service interfaces 8 (weather forecast, location services etc.) as well as various input and output devices 17 and metering devices 9 including a utility or power company owned metering device. The automated household energy management system can also include one or more communication arrangements 5 and a network 16 operable to transmit communications between the various external devices. Communication as described here includes receiving, transmitting, transferring and collecting data, assigning values to parameters, controlling appliances etc.

The memory or storage is used to store information associated with the automated household energy management system. The information may include user specified control class of one or more controlled appliances, household parameters, indoor environment parameters, outdoor environment parameters, limits and preferences, energy consumption history and measurements, collected variable values representing sensor output etc., generated or updated household energy consumption profiles, data defining a site, zone, location etc., data associated with a site, zone, location etc., location of an user, location history of an user, a time series of locations of an user, an estimate based on location information of an user, alternative control schemes relative to a defined objective, alternative suggestions and guidance relative to a defined objective, energy budget information etc.

Referring to the embodiment illustrated by FIG. 1 and according to a further aspect, an automated household energy management system can include a server 10 configurable to manage energy use at site 11. A server can include a processor or multiple processors having one or more processing cores as needed or desired, one or more databases that can be internal or external to server, and memory configurable to store data. According to an aspect, server can be located in a single location or multiple locations, and server configurations including cloud computing, distributed computing, dedicated computing, or any combination thereof can be deployed.

According to another aspect, server can include an interface 12 operable to communicate data between site 11 and server 10. Server can also include a mobile client interface 13 that can be coupled to a wireless telecommunications communication gateway. According to an aspect, mobile client interface can communicate with one or more mobile devices 14, using a network provided by a wireless telecommunications provider and can include secure connection capabilities.

In an embodiment of the system and method according to the present invention, the communication may be from multiple sources. The multiple sources may be different networks or different arrangements of communication. The communication may include SMS, fax, email, instant message, internet protocol, voice, voicemail, GPRS, CDMA, WAP protocol, internet or text. The information may be transmitted in a costless manner, a cost reduced manner or in the form of a DNS lookup.

According to a further aspect, a user mobile device 14 can communicate with the automated household energy management system 1 by communication arrangements 15 using a WiFi or 802.11 based communication, Bluetooth communication, a subscriber based wireless data communication network such as a 3G network, 4G network, EDGE network, a cellular network, other wireless data communication, or any combination thereof. Access to the automated household energy management system, a storage file or information may be password protected and the storage file or information may be encrypted. The storage file may be an XML document, a database, a table or a text file.

According to a further aspect, a user device or mobile device can communicate with the automated household energy management system server using a mobile client interface 13. Access to the server, the mobile client interface, a storage file or information may be password protected and the storage file or information may be encrypted. The storage file may be an XML document, a database, a table or a text file.

The mobile device may generally, without limitation, be a mobile phone, a GPS enabled mobile phone, a CDMA enabled mobile phone, a GPRS enabled mobile phone, a 3G/4G enabled mobile phone, a mobile phone with a camera, a mobile phone with browser capabilities, a GPS unit, a tracking unit, a portable electronic device with a compass, a laptop computer, a tablet device, a personal digital assistant, an MP3 player, a camera, a handheld device, a pager, and/or a portable gaming device. The mobile device may be wearable.

Figure 2:
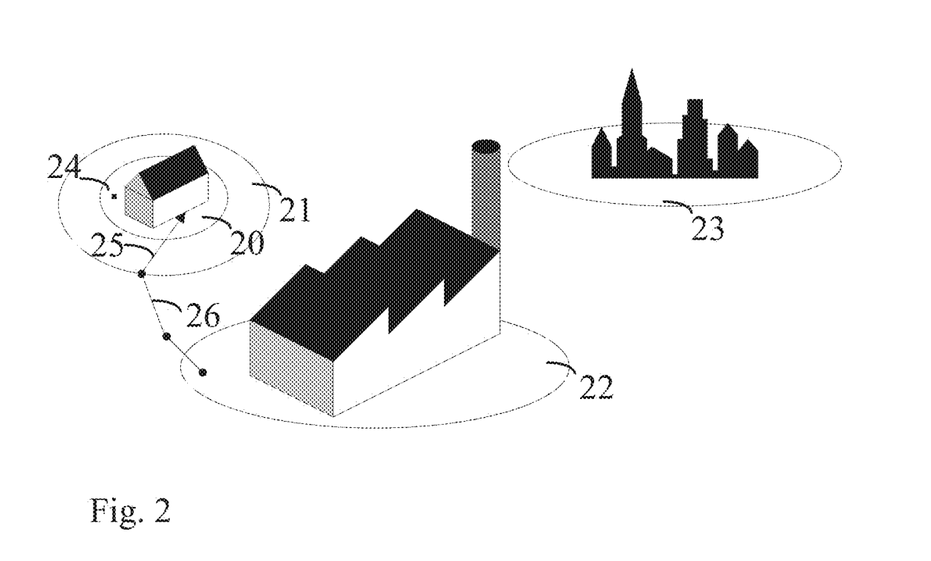
FIG. 2 illustrates one embodiment of location based presence detection utilization with exemplary zones associates with an automated household energy management system according to the present invention

FIG. 2 illustrates one embodiment of location based presence detection with exemplary zones of the system according to the present invention. The communication of a user mobile device with the automated household energy management system or server thereof includes detecting, determining or communicating presence near site, relative distance from site or an absolute location of the mobile device. Further, this communication can be for the system to verify or to estimate, when a mobile device is switching between zones. For this end, the system or mobile device may need information of bearing, speed etc. of the device. Even further, the mobile device can be capable, for example by utilizing a mobile application of a location service, to verify or estimate that it has or presumably will enter a zone or make a switch from a zone to another.

A person carrying a mobile device can be detected on the basis of the Bluetooth, Wi-Fi, near field communication, or cellular network signals being sent from the cellular phone. As a further example, the mobile device can use a GPS or an application or service for determination of location and communicate said location to the automated household energy management system as coordinates, relative location or distance. Using a service, as example geo-fencing for presence detection, information such as (geographical) zone presence and entering or leaving a zone or area may be provided by the service for the automated household energy management system. In response to said communication the automated household energy management system decides, whether the mobile device is present within an area or distance regarded as home or site 20, neighborhood 21, working place 22, city center 23 etc.

A variety of methods and systems may be utilized for locating or tracking mobile devices.

These systems and methods may offer a user interface, service and mobile device application, which may communicate a current location or movement of a mobile device in a format such as an XML document, a script, an HTML document, a program, a database, a table, a message, a folder, an application, an animation and/or a text file.

Utilizing a locating or tracking capability interlinked with the system and method according to the present invention can include arrangements for receiving location or zone based information associated with a location, zone or site and outputting a version of such information through the mobile device.

Information may be received in response to a transmission of the location of the mobile device. The system may by collection or storage of mobile device location information and associated time of said location, create a time series representation and information may be received in response to a transmission of such time dependent location data. The information may further be received in response to a calculated estimate of time-of-arrival, zone-switch-over etc. based on the associated information of the mobile device location, movement etc. transmitted. The output version of such information may without limitation be visual, audio, a facsimile, an email, voice, a light, a change in the intensity of a light, a change in the color of a light, via SMS, via an instant message, via a text message, and/or an application that may only be available at a location representing a household, site, zone or location.

In some embodiments, information or suggestions may be transmitted together with information received in response to a transmission of location, estimate etc. of the mobile device. In response of the information or suggestions further communication between the mobile device and automated household energy management system or server thereof can entail, the user indicating or initiating a change in the state of an controlled device by utilizing the user interface of the mobile device and effecting a transmission of a request to the automated household energy management system on the one or more controller thereof.

Information may be defined in relation to an area, zone or a location. The information may be specific to a user and may without limitation be in an XML format, be in a database format, and/or be in a text file format. A suggestion, which may relate to an item or appliance of the area, zone or a location, may be triggered in response to the information. The suggestion may at least partially be based on the location or estimate thereof of a mobile device and more generally on information associated with presence.

The present invention may provide for a utilization of presence, wherein a location of a mobile device may be transmitted, stored in a file, stored with other information and reported along with an indication of the movement of the mobile device. The information itself may be displayed on a map and may comprise an indication of speed and/or direction.

Even further, what is said about location and presence of an mobile device and associated user thereof, the automated household energy management system according to the present invention may utilize above mentioned sensors, such as infrared sensors or feasible items belonging to a home security or automation system, to determining presence at a zone or site and even further to infer qualitative and quantitative qualities of detected objects as for example the detected object being an adult, a child, a pet etc. and the activity, behavior or intentions of such.

More generally, a state or status of a home security system or a home automation system may be used by the automated household energy management system to infer information of presence, activity and intentions of a site or zone. The state or status may be based on sensor data, analysis thereof or user inputs. For example, if the user arms the alarm system of the site, alarm/monitored zone or house or parts thereof, the automated household energy management system may infer, that the site, zone or house, or parts of it are supposed to be non-occupied. The automated household energy management system may then act according to rules, parameters and collected variables of the automated household energy management system.

The present invention may provide control and information by storing the location of a plurality of mobile devices and objects, possibly in an electronic storage file which may be remote. The invention may provide access to the storage file, which may contain information pertaining to locations and motion of the mobile devices and objects.

The invention may provide information associated with user of a mobile device and appliances associated to the user. Location, tracking and estimation information may constitute behavior, intention, traffic patterns etc.

The present invention may provide methods and systems for effecting change on an appliance in response to the control class assigned to the appliance, location information, presence, time, indoor environment values, outdoor environment values etc.

The method may involve receiving and collecting location information, presence, time, indoor environment values, outdoor environment values etc. and effecting a change on the energy consumption status on an appliance based on said information and a control class assigned to said appliance.

The method may involve receiving and collecting location information, presence, time, indoor environment values, outdoor environment values etc. and suggesting a change on the energy consumption status on an appliance based on said information and a control class assigned to said appliance. The method may involve effecting a change in the energy consumption status of an appliance upon receiving a request from a user of a mobile device or an I/O device of the system. The suggestion or request may involve audio, video, a picture related a location, fax, email, instant message, text message, SMS, internet protocol, voice, voicemail, vibration, stimulation at least one of the five senses or an alert. The alert may involve fax, email, instant message, text message, SMS, internet protocol, voice, voicemail, vibration or stimulation of at least one of the five senses.

The suggestion may involve information on energy consumption, a difference between an energy consumption profile and present consumption, an energy budget, an estimate of the effect of actions on consumption etc. The suggestion may involve a reminder regarding energy consumption, a difference between an energy consumption profile and present consumption, an energy budget, an estimate of the effect of actions on consumption etc. The suggestion may involve a list of alternatives or availability of alternative actions. The suggestion may involve guidance and estimated impacts on energy consumption associated with the list of alternatives or availability of alternative actions.

Information may be updated continuously or periodically, in accordance with set preferences or in response to a request. The frequency of the control actions or suggestions made by the automated household energy management system may also be varied in response to speed, location, specified preferences, proximity to a point of interest, or changes in a site or zone. A user may make a request to the automated household energy management system for information or suggestions helping the user to maintain a budget, save energy etc.

The present invention may provide for methods and systems of triggering the output of location based information involving receiving information via a mobile device and outputting location based information based on the received information. The information may be received via a sensor, which may measure the parameters of a site or zone.

The present invention may provide methods and systems for location determination involving capturing characteristics of a location using a mobile device, transmitting those characteristics and receiving location based information. The characteristics may be captured as a picture, a photograph, verbally or using at least one sensor. The characteristics may be transmitted via SMS, fax, email, instant message, text message, internet protocol, voice, voicemail, GPRS, CDMA, WAP protocol, internet, text or as a file.

The present invention may provide methods and systems for utilizing location based information for a mobile device involving obtaining multiple data points for a given location. The multiple data points may be analyzed using a feasible algorithm. The information may relate to location, velocity or direction.

The system and method according to the present invention may involve methods and systems of defining a geo-fence on by using a service, application or a mobile device interface involving inputting the center and a radius of a geo-fence on a map based application or by an user input on the mobile device defining a current location as a center or relative point of the geo-fence together with an input defining a radius relative to the given point. The geo-fence may be defined using a cursor on the display of the mobile device. The geofence may be defined using a touch screen on the mobile device. The geo-fence may be defined by the location of the mobile device. The geo-fence may be defined by placing the mobile device at certain points comprising the geo-fence. The geo-fence may be defined in real time by placing the mobile device at certain points comprising the geo-fence. The geofence may be manipulated using the mobile device. The geo-fence may be a circle, a sphere, in the shape of any closed polygon, curve, a closed volume, in two dimensions, in three dimensions or may travel with a person (i.e. it may be dynamic).

The geo-fence may be defined on a computer screen involving inputting the geo-fence through a user interface using a pointing device such as a mouse or stylus or other feasible devices or method. The radius, shape or dimensions of the geo-fence may also be defined or changed accordingly.

The present invention may provide methods and systems of analyzing information related to at least one mobile device involving transmitting information from the at least one mobile device and analyzing such information using the processing units and resources of the automated household energy management system or receiving such analyzed data from a service. The analyzing may involve comparing transmitted information to stored history information to estimate behavior, intent and activity of the user associated with the mobile device.

Access to the automated household energy management system, server or one or more controllers may be granted at different access levels. A user may be granted partial or restricted access via a login.

Various user interfaces may be presented on an I/O device of the system and a mobile device. The interface may display a map, layout or a menu or provide an overview of the locations or presence or history thereof. A site, zone or geo-fence may be created using a graphical user interface and an icon may be assigned to a site, zone or geo-fence. The interface may also present icons, status or information of one or more controlled appliance, sensors and other devices associated with the site, zone or geo-fence.

As described above, the location or presence communication can represent an associated location 24 or be a continuous or periodic communication constituting a time series 26 of distance or locations in which case the automated household energy management system may also arrive at an estimate 25 of actions, behavior, time-of-arrival or switch-over between zones based on the movement of the mobile device and associated information thereof.

Each of the electric appliances 6 illustrated by FIG. 1 connected to the automated household energy management system control network 16 can comprise one or more power consuming features/functions. For example, appliance can be a refrigerator, an HVAC system, lighting or any energy consuming appliance, optionally capable of having power consumption measured thereat. The controlled appliances are assigned a control class by the user or by default. The control class defines attributes of an appliance, such as the entity allowed to request to turn off/on or adjust the state of said appliance. Further, the attribute can be a defined time period or defined measureable indoor or outdoor environment under which the appliance is allowed to be controlled.

Even further, appliances having an effect on the indoor environment may be controlled accordingly to maintain and enhance the indoor environment status. Appliances such as for example air-purifiers, humidifiers, conditioners, ventilation etc. may be controlled to reach desired indoor environment parameters and to regulate the energy consumption of such appliances, when the circumstances allow doing so.

The automated household energy management system may also control appliances and their consumption of energy by calculating alternative appliance utilization schemes yielding within acceptable limits a similar objective in respect of set parameters and limits. The system may thus choose an energy efficient alternative of operation, when available. Further, the automated household energy management system may also control appliances and their consumption of energy by calculating alternative appliance utilization schemes yielding within acceptable limits a similar objective in respect of set parameters and limits to suggest an energy efficient alternative of operation for a user, when available.

According to one aspect, the automated household energy management system generally comprises a central device or central controller 4 or hardware or software control logic for controlling power consumption appliance connected to the associated energy management network 16 of a household. The controller is operatively connected to each of the power consuming features/functions of said devices. The controller is configurable to turn off, turn on and adjust the energy consumption level of an appliance in response to one or more input signals it receives from the automated household energy management system.

An electric appliance may also be switched on or off or adjusted manually by the user as part of normal daily utilization of said appliance or in response of a suggestion received from the automated household energy management system 1 via an output device 17 such as an display or other indicator or in response of a communication received from the automated household energy management system to a user mobile device 14. Further, a user upon receiving a communication from the energy management at the mobile device or another output device suggesting switching on or off or adjusting an appliance, the user may request a control action of an appliance by sending an associated request to the automated household energy management system by using the mobile device. Even further, the user may request a control action of an appliance by sending an associated request to the automated household energy management system even if no suggestions are communicated prior by the automated household energy management system, as part of normal daily utilization or control of said appliance.

Figure 3:
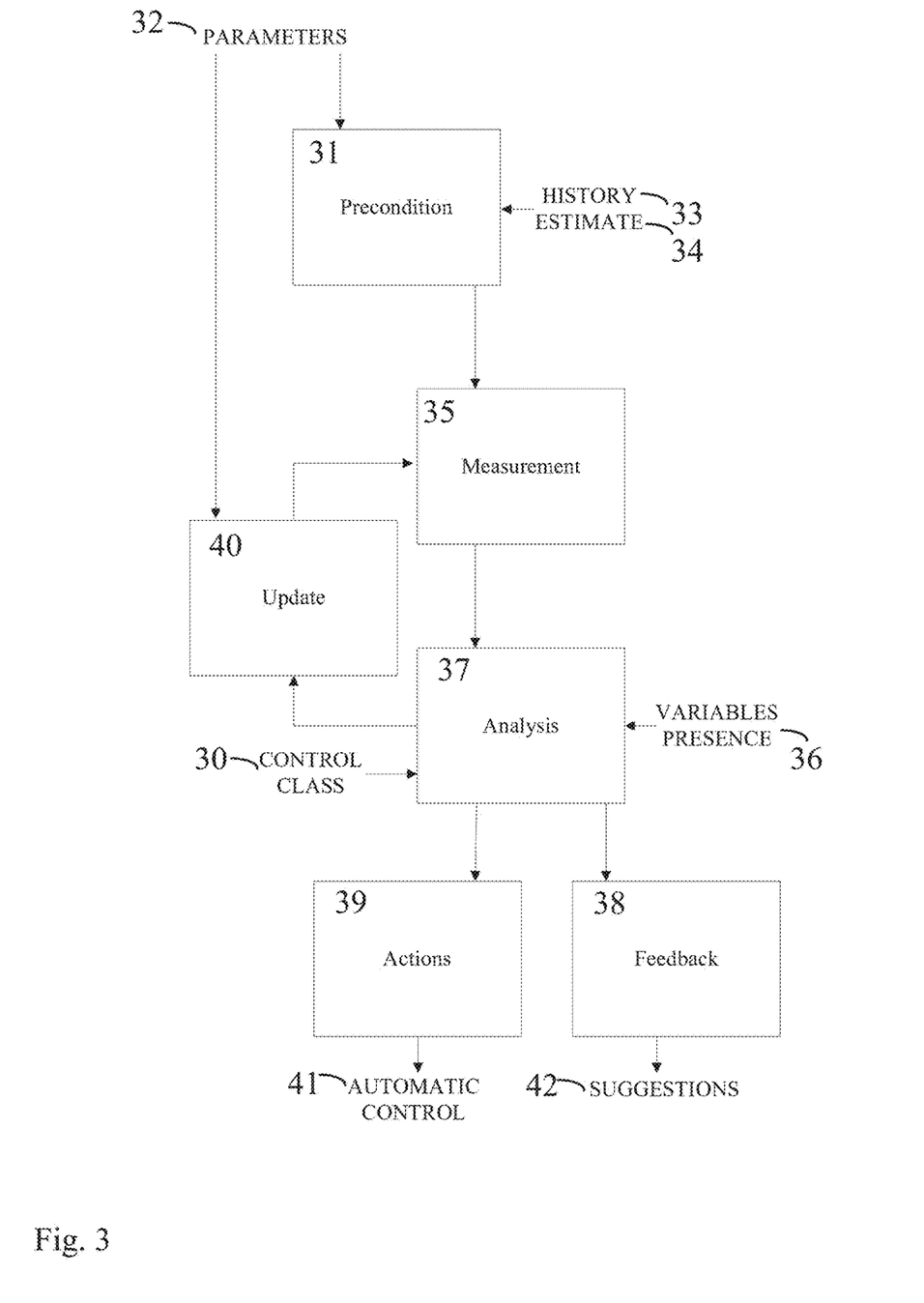
FIG. 3 is a flow diagram of an embodiment of an automated household energy management method in accordance with the present invention.

For illustrative purposes, an embodiment of the method according to the present invention is illustrated in FIG. 3 in a flow diagram format.

In order to actively steer household energy savings, whenever a new appliance that can be controlled is introduced in household home automation network, user is asked to assign it to one of control or savings classes 30 that may include but are not limited to:

i. Shall not be turned off at any time—for appliance from this class only energy consumption is followed.
ii. Shall not be turned off automatically—appliances from this class cannot be turned off by home automation system. However they can be turned off by user action. Home automation system is capable of notifying user about possibility to turn off appliance.
iii. Can be turned off during defined time period—appliances from this class can be turned off automatically by the home automation system if conditions are fulfilled, taking presence information in to account (for example no occupants at home and time between 08:00 and 16:00)
iv. Can be turned off anytime—appliances from this class can be turned off automatically by home automation system without time restrictions if conditions are fulfilled (no one at home, night-time)
v. Performance can be lowered during defined time period—appliances from this class can be put into mode that consumes less energy if conditions are fulfilled (for example HVAC goes to energy saving mode if no occupants at home and time between 08:00 and 16:00 and environment conditions are within defined range)
vi. Control is given to 3rd party (electricity utility company, etc.)—home automation system exposes interface (API) for electricity utility companies that allow them to control appliances from this group. Whenever needed utility company can remotely turn on/off appliance or change performance of appliance.

Upon initial home automation system setup 31 energy related data, parameters 32, are collected from the user. Data needed to create initial profile may include: household type (house, apartment etc.), household size (square meters or feet or number of rooms), number of inhabitants in household, location of household, type of household heating/ventilation/air conditioning, estimated monthly electrical energy budget, previous year(s) monthly energy spending (electric energy monthly consumption for particular household), and/or energy tariffs (day, night, solar).

Available past energy consumption data history 33 is entered either via UI as numbers or imported as data series. If no historical data is available the system will create initial household profile based on an estimate 34 on hourly energy consumption. The profile may be generated by any known feasible approach known in the art, as that described in *A model for generating household electricity load profiles* by Jukka V. Paatero and Peter D. Lund, published in the *International Journal of Energy Research*, 2006; 30: 273-290, which is hereby incorporated as a reference.

The need of detailed appliance usage and energy consumption data may be overcome by using representative data samples and statistical averages. A seemingly random element of energy consumption can be generated by the use of stochastic processes and probability distribution functions. Using readily available appliance information and consumer statistics can be used to obtain detailed and realistic electricity consumption estimates. It has been shown earlier in the art, that such a household energy profile exhibits a periodic behavior on a seasonal, daily and hourly scale.

The daily electricity consumption on a yearly level is often dependent on external variables such as the mean outside temperature and daily daylight hours that typically follow similar patterns over successive years. At individual household level the electricity load curves differ significantly.

By cleverly using an approach that defines the general fluctuation of diurnal consumption levels and separate appliances or groups of appliances for a household and simulating separately the use of each appliance or group thereof, a household energy profile can be generated even if there is not enough past energy usage data available.

The home automation system has arrangements to measure 35 total household energy consumption through dedicated energy meters or to receive corresponding data from energy utility companies. During initial home automation system setup 31, deviation limits and reporting error margins may be requested as parameters 32 from the user. Such parameter values can be collected either as percentage or kWh or monetary cost units as household consumption per selected time period. In addition to the collected energy data, the home automation system may measure or collect variables 36 such as local weather condition data (temperature, humidity, day length) either from local sensors or weather forecast services. The system also has arrangements to detect variables 36 such as the presence of persons within an area defined as "home" as described later.

Collected actual energy consumption data is stored and periodically or continuously analyzed 37 against the created household energy profile. Deviation between measured data and household profile is calculated and compared against one or more limits set by the user. In addition to measured energy consumption, variable conditions such as weather conditions, home occupants presence etc. are collected. Comparing collected actual data to the household energy profile, a deviation from energy consumption pattern can be detected, if the comparison yields a deviation surpassing an associated limit.

Important input variable 36 to actively drive energy management at home is presence information that will be derived from location data. The user's mobile device location information can be used for that purpose. Such information can be of detail level where there is precise location obtained from device (longitude, latitude, altitude, bearing, speed and accuracy) or it can be of coarse nature where presence in network or user selectable (home, work, etc.) location is collected depending on the feasible level of accuracy and intended application in the embodiment of the method and system of the present invention.

An approach called geo-fencing can be used. Such approach requires creating so called geo-fences—geographically constrained areas defined by location and radius. Geo-fence service then follows particular device in relation to existing geo-fences and detects whenever device is leaving, entering or staying within defined geo-fence. At minimum one geofence, "Home", needs to be defined in the home automation system, describing the managed object location.

When a deviation surpasses a defined limit the home automation system defines feedback 38 to the user about change in household usage pattern and triggers automated control 39 described below. Additionally, the newly measured household consumption value may be used to update 40 household energy consumption profile. As feedback, all measured household energy consumption data is preferably preserved for user to be viewed as time series. Based on provided estimated yearly energy budget the home automation system uses individual household energy profile to calculate budget situation (overspent, savings, spot on) and indicate as feedback it to home automation system user. Time-to-surpass a budget can also be estimated.

If there are big changes in household environment (additional insulation, change in heating etc.) the household energy profile can be updated 40 by parameters 32 by the user to represent the managed environment as closely as possible. Request to user to modify energy spending estimates and confirm change in consumption pattern is generated.

Home automation system abides to parameters and variables to make energy management actions. Presence of persons in household or changes (transition) in the situation may be used for determining actions to be executed. For instance, if no occupants are present in home geo-fence, the home automation system may be configured to turn off all appliances that are allowed by their classification as automatic control 41. The system may actively suggest 42 users about the possibility of turning off appliances that need to be turned off by user. Achieved energy saving by doing so can be estimated and communicated to the user.

Defined permissible indoor environment parameters for household such as maximum or minimum allowed temperature, humidity, $CO_2$ levels, etc. are used to control a HVAC unit to impose energy savings. However, whenever relevant sensors indicate out of defined boundaries values and persons are present at home the home automation system regulates needed appliances to get indoor environment back to defined limits to maintain acceptable conditions for the building structures and comfortable indoor environment for the building occupants.

Actual time and defined time intervals (night time, work/school time, at home time, weekday, weekend) are used by the home automation system to adjusts energy consumption based on household occupancy and parameter settings defined by user.

Using measured weather parameters or weather forecast data the home automation system manages appliances to save energy and maintain acceptable conditions for the building structures and comfortable indoor environment for the building occupants.

The home automation system thus actively strives to turn off or lower the energy consumption of appliances allowed by their classification, based on defined time periods and occupant presence in the household, abiding structural and environmental conditions. Further, the home automation system informs and suggests the user with corrective measures, when a change in household usage pattern is detected and suggest.

The scope of the invention is determined by the attached claims together with the equivalents thereof. The considerations present in the construction of the independent and dependent claims of the method of the present invention are to be considered as equally valid considerations, mutatis mutandis, in the construction of the independent and dependent claims of the system of the present invention, and vice versa. The skilled persons will again appreciate the fact that the explicitly disclosed embodiments were constructed for illustrative purposes only, and the scope will cover further embodiments, embodiment combinations and equivalents that better suit each particular use case of the invention.

The invention claimed is:

1. In a household energy management system having one or more controlled appliances and a household energy profile representing a household energy consumption and one or more associated parameters and limits, a method comprising:

assigning each of said controlled appliances a control class, collecting one or more variables, the one or more variables comprising at least geo-fencing information pertaining to a user, determining a first group of said appliances based on the control class of said appliances and said one or more variables and said parameters, so that the first group of said appliances comprises appliances controlled in accordance with said geo-fencing information, wherein defining the geo-fencing information on by using a service, application or a mobile device interface involving inputting the center and a radius of a geo-fence or otherwise closed area or space, including a polygon or closed curve, defining a geo-fence on a map based application or by an user input on the mobile device defining a current location as a center or relative point of the geo-fence together with an input defining a radius or otherwise closed area or space relative to the given point, requesting a change in the power consumption of the appliances of said first group in accordance with collected geo-fencing information, measuring the energy consumption of the household, calculating a difference between said household energy profile and measured energy consumption, determining a second group of said appliances different from said first group based on the control class of said appliances and said one or more variables and said parameters, so that the second group comprises appliances that are not controlled in accordance with geo-fencing information, communicating a proposed change in the power consumption of the appliances of said second group when said difference surpasses said one or more associated limits, and requesting a change in the power consumption of one or more appliances of said second group upon receiving of one or more requests in response of said communication, wherein the determining a first group further comprises of identifying one or more groups of said appliances based on the control class of said appliances and said one or more variables and said parameters, and determining the first group based on selecting a group among the identified one or more groups of said appliances, wherein the determining a second group further comprises of identifying one or more groups of said appliances based on the control class of said appliances and said one or more variables and said parameters, said second group being a set of said one or more groups of said appliances.

2. The method according to claim 1, wherein said household energy profile is based on parameters representing household type, household size, number of inhabitants, location, heating type, ventilation type, air-conditioning type, energy budget, energy spending, energy tariffs, energy consumption history or model calculation.

3. The method according to claim 1, further comprising adjusting said household energy profile based on said measured energy consumption of the household.

4. The method according to claim 1, wherein said control class specifies at least one attribute selected from the group consisting of: control authority, time period, environment conditions.

5. The method according to claim 1, wherein said control class specifies at least one attribute selected from the group consisting of: control authority, time period, environment conditions, and said control authority further defines an entity allowed to make a change in the power consumption of an associated appliance and includes system, user, occupant or third party.

6. The method according to claim 1, wherein said parameters represent at least one attribute selected from the group consisting of: household type, household size, number of inhabitants, location, heating type, ventilation type, air-conditioning type, energy budget, energy spending, energy tariffs, energy consumption history, model calculation, occupant presence, time, time interval, indoor environment, outdoor conditions.

7. The method according to claim 1, wherein values of said one or more variables represent at least one condition selected from the group consisting of: occupant presence, user location, user movement, estimated time-of-arrival, estimated time-of-arrival at a predefined geographical zone, estimated switch between geographical zones, activity, time, indoor environment, outdoor conditions.

8. A household energy management system having one or more controlled appliances and an associated network and a household energy profile representing a household energy consumption and one or more associated parameters and limits, the system comprising:

measurement units configurable to collect values of one or more variables, said one or more variables comprising at least geo-fencing information pertaining to a user, wherein defining the geo-fencing information on by using a service, application or a mobile device interface involving inputting the center and a radius of a geo-fence or otherwise closed area or space, including a polygon or closed curve, defining a geo-fence on a map based application or by an user input on the mobile device defining a current location as a center or relative point of the geo-fence together with an input defining a radius or otherwise closed area or space relative to the given point, and an energy consumption of the household, storage units configurable to store a control class of each said one or more appliances, said energy profile, one or more associated parameters and limits, collected variables, and energy consumption, processing units configurable to determine a first group of said appliances, so that the first group comprises appliances controlled in accordance with said geo-fencing information, and a system request based on the control class of the appliances and said one or more variables and said parameters, at least in accordance with collected geo-fencing information, and to determine a second group of said appliances different from the said first group and based on the control class of the appliances and said one or more variables and said parameters, so that the second group comprises appliances that are not controlled in accordance with geo-fencing information, and to calculate a difference between said energy consumption and said energy profile, and to compare said difference to said one or more associated limits, communication arrangements configurable to communicate a proposed change in the power consumption of said second group of appliances according to the control class of said appliance of the second group when said difference surpasses said one or more associated limits, and configurable to receive one or more user requests in response to said communication, and controlling units configurable to perform a requested change in the power consumption of said first group of appliances based on said system request, and configured to perform a requested change in the power consumption of one or more appliances of said second group upon receiving of said one or more user requests, wherein the determining a first group further comprises of identifying one or more groups of said appliances based on the control class of said appliances and said one or more variables and said parameters, and determining the first group based on selecting a group among the identified one or more groups of said appliances, wherein the determining a second group further comprises of identifying one or more groups of said appliances based on the control class of said appliances and said one or more variables and said parameters, said second group being a set of said one or more groups of said appliances.

9. The system according to claim 8, wherein said processing units are further configurable to calculate a household energy profile based on parameters representing household type, household size, number of inhabitants, location, heating type, ventilation type, air-conditioning type, energy budget, energy spending, energy tariffs, energy consumption history or model calculation.

10. The system according to claim 8, wherein said processing units are further configurable to calculate an updated household energy profile based on said measured energy consumption of the household.

11. In a household energy management system having one or more controlled appliances and a household energy profile representing a household energy consumption and one or more associated parameters and limits, a method comprising:

assigning each of said controlled appliances a control class, collecting one or more variables, the one or more variables comprising at least geo-fencing information pertaining to a user, determining a first group of said appliances based on the control class of said appliances and said one or more variables and said parameters, so that the first group of said appliances comprises appliances controlled in accordance with said geo-fencing information, wherein defining the geo-fencing information on by using a service, application or a mobile device interface involving inputting the center and a radius of a geo-fence or otherwise closed area, including a polygon or closed curve, defining a geo-fence on a map based application or by an user input on the mobile device defining a current location as a center or relative point of the geo-fence together with an input defining a radius or otherwise closed area or space relative to the given point, requesting a change in the power consumption of the appliances of said first group in accordance with collected geo-fencing information, measuring the energy consumption of the household, calculating a difference between said household energy profile and measured energy consumption, determining a second group of said appliances different from said first group based on the control class of said appliances and said one or more variables and said parameters, so that the second group comprises appliances that are not controlled in accordance with geo-fencing information, communicating a proposed change in the power consumption of the appliances of said second group when said difference surpasses said one or more associated limits, and requesting a change in the power consumption of one or more appliances of said second group upon receiving of one or more requests received in response of said communication, wherein the determining a first group further comprises of identifying one or more groups of said appliances based on the control class of said appliances and said one or more variables and said parameters, and determining the first group based on selecting a group among the identified one or more groups of said appliances, and wherein the determining a second group further comprises of identifying one or more groups of said appliances based on the control class of said appliances and said one or more variables and said parameters, said second group being a set of said one or more groups of said appliances.

\* \* \* \* \*